(12) United States Patent
Iguchi et al.

(10) Patent No.: US 10,850,925 B2
(45) Date of Patent: Dec. 1, 2020

(54) CHAIN FOR VACUUM CONVEYOR

(71) Applicant: DAIDO KOGYO CO., LTD., Ishikawa (JP)

(72) Inventors: Hayato Iguchi, Ishikawa (JP); Daigo Sawada, Ishikawa (JP)

(73) Assignee: DAIDO KOGYO CO., LTD., Ishikawa (JP)

( * ) Notice: Subject to any disclaimer, the term of this patent is extended or adjusted under 35 U.S.C. 154(b) by 0 days.

(21) Appl. No.: 16/524,880

(22) Filed: Jul. 29, 2019

(65) Prior Publication Data

US 2019/0344968 A1 Nov. 14, 2019

Related U.S. Application Data

(63) Continuation of application No. PCT/JP2017/003250, filed on Jan. 30, 2017.

(51) Int. Cl.
*B65G 17/46* (2006.01)
*B65G 17/08* (2006.01)
*B65G 17/28* (2006.01)
*B65G 17/38* (2006.01)

(52) U.S. Cl.
CPC ............. *B65G 17/46* (2013.01); *B65G 17/08* (2013.01); *B65G 17/28* (2013.01); *B65G 17/38* (2013.01)

(58) Field of Classification Search
CPC ........ B65G 17/08; B65G 17/28; B65G 17/38; B65G 17/46
USPC .......... 198/689.1, 803.5, 850, 851, 852, 853
See application file for complete search history.

(56) References Cited

U.S. PATENT DOCUMENTS

| 5,178,260 | A | * | 1/1993 | Hochbein | ......... H01L 21/67034 |
| | | | | | 198/803.15 |
| 5,305,869 | A | * | 4/1994 | Damkjaer | .............. B65G 17/08 |
| | | | | | 198/689.1 |
| 5,351,811 | A | * | 10/1994 | Tisma | .................... B65G 17/42 |
| | | | | | 198/793 |
| 5,596,917 | A | * | 1/1997 | Gerber | ................... B26D 7/018 |
| | | | | | 198/689.1 |
| 5,648,140 | A | | 7/1997 | Vaders | |
| 5,857,561 | A | * | 1/1999 | Hardman | .............. A24C 5/1857 |
| | | | | | 198/846 |
| 6,360,881 | B2 | * | 3/2002 | Stebnicki | ............. B65G 17/086 |
| | | | | | 198/850 |

(Continued)

FOREIGN PATENT DOCUMENTS

| CN | 101959773 | 1/2011 |
| CN | 103612875 | 3/2014 |

(Continued)

OTHER PUBLICATIONS

International Search Report dated May 9, 2017 in International (PCT) Application No. PCT/JP2017/003250.

(Continued)

*Primary Examiner* — Douglas A Hess
(74) *Attorney, Agent, or Firm* — Wenderoth, Lind & Ponack, L.L.P.

(57) ABSTRACT

A chain for a vacuum conveyor, includes a plurality of links each having a flat front surface for placing a conveyance object and a back surface facing to a suction portion. A plurality of adsorption holes each having a large opening area on the front surface and a small opening area on the back surface is formed in the link.

4 Claims, 10 Drawing Sheets

(56) References Cited

U.S. PATENT DOCUMENTS

| | | | | |
|---|---|---|---|---|
| 6,705,460 B2* | 3/2004 | Weiser | ............... | B65G 17/086 |
| | | | | 198/850 |
| 7,267,221 B2* | 9/2007 | Hall | ............... | B65G 17/08 |
| | | | | 198/850 |
| 7,364,036 B2* | 4/2008 | Schoepf | ............... | B65G 17/08 |
| | | | | 198/850 |
| 7,575,113 B2* | 8/2009 | Sedlacek | ............... | B01D 33/04 |
| | | | | 198/850 |
| 7,954,815 B2* | 6/2011 | Bober | ............... | B41J 11/007 |
| | | | | 198/833 |
| 9,731,902 B2* | 8/2017 | Balsells Mercade | .... | B26D 7/20 |
| 10,543,987 B2* | 1/2020 | Gundlach | ............... | B65G 15/30 |
| 10,613,523 B2* | 4/2020 | Burkhard | ............ | G05B 19/4189 |
| 2012/0211030 A1 | 8/2012 | Jones | | |

FOREIGN PATENT DOCUMENTS

| | | |
|---|---|---|
| CN | 103836114 | 6/2014 |
| JP | 2-145220 | 12/1990 |
| JP | 3-232621 | 10/1991 |
| JP | 10-129820 | 5/1998 |
| JP | 2001-335135 | 12/2001 |
| SU | 737318 | 6/1980 |

OTHER PUBLICATIONS

Office Action dated Jul. 31, 2020 in corresponding Chinese Patent Application No. 201780085097.2.

\* cited by examiner

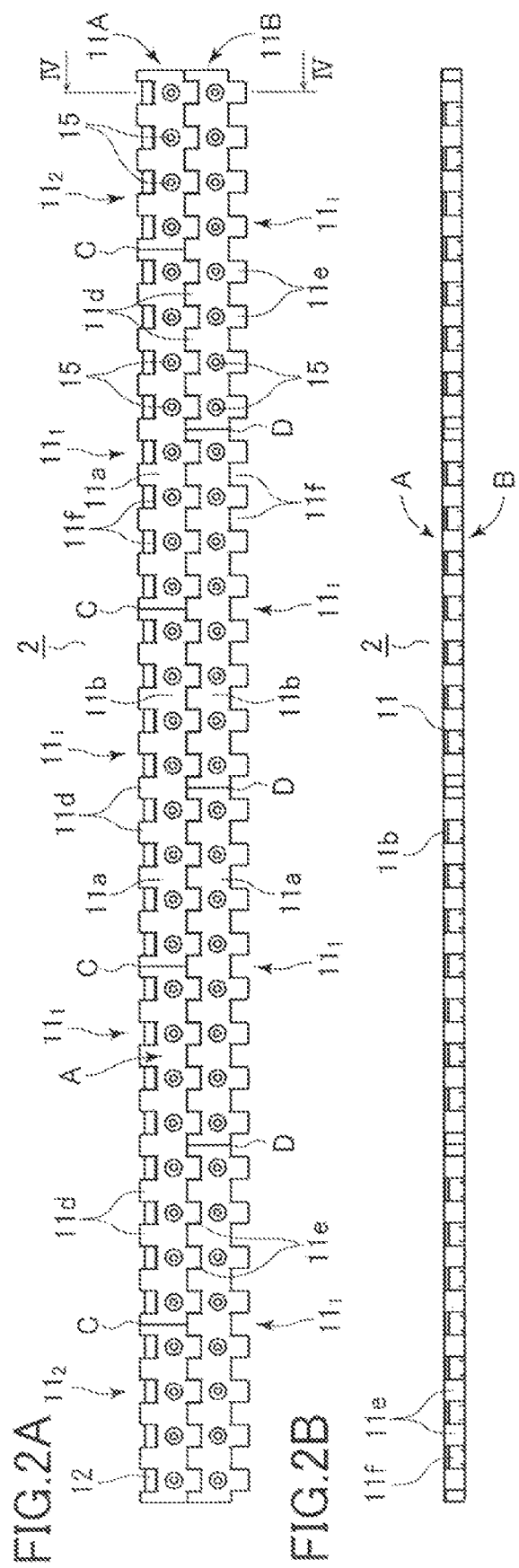
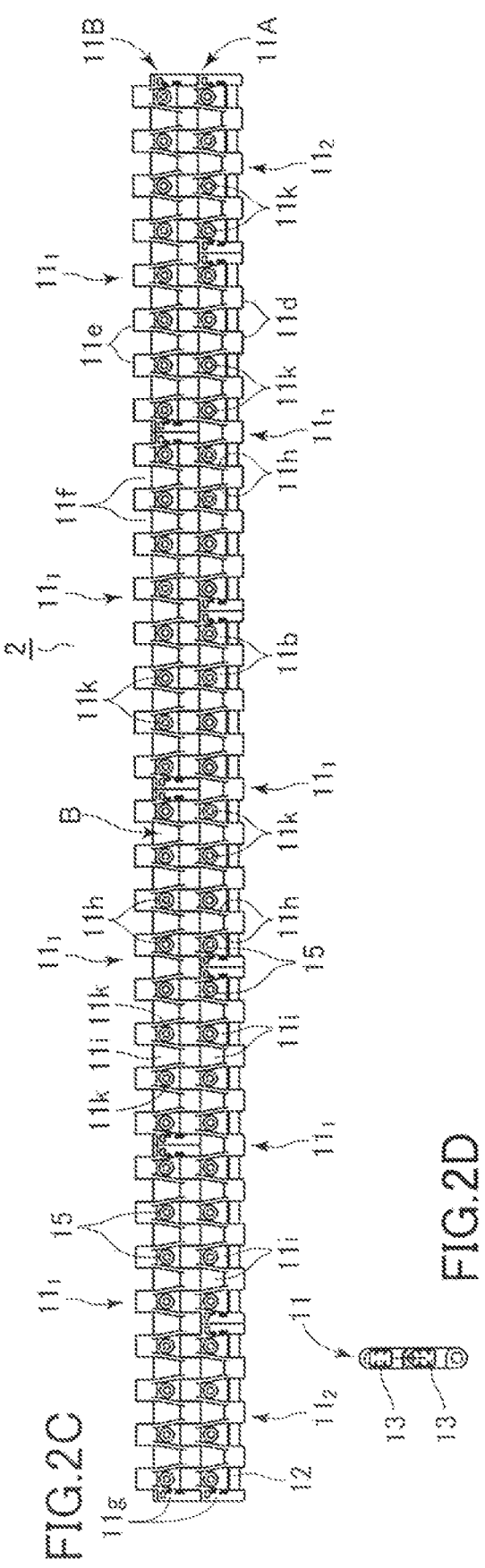

FIG.6

| No. | 1 | 2 | 3 | 4 | 5 | 6 | 7 | 8 | 9 |
|---|---|---|---|---|---|---|---|---|---|
| HOLE SECTIONAL PROFILE | | | | | | | | | |
| PRESSURE [Pa] | 167.8 | 183.8 | 126.3 | 122.2 | 141.0 | 156.1 | 98.9 | 144.0 | 158.0 |
| ADSORPTION AREA [mm2] | 7.1 | 7.1 | 38.5 | 38.5 | 38.5 | 38.5 | 7.1 | 11.3 | 7.3 |
| ADSORPTION POWER [N] | 0.0012 | 0.0013 | 0.0049 | 0.0047 | 0.0054 | 0.0060 | 0.0017 | 0.0016 | 0.0012 |

CHAIN FOR VACUUM CONVEYOR

CROSS-REFERENCE TO RELATED APPLICATIONS

This application is a Continuation of International Patent Application No. PCT/JP2017/003250, filed Jan. 30, 2017, which is hereby incorporated by reference herein in their entirety.

BACKGROUND OF THE INVENTION

Field of the Invention

The present invention relates to a chain for a vacuum conveyor configured to convey a conveyance object such as a can while adsorbing by negative pressure.

Description of the Related Art

Hitherto, there is known a vacuum conveyor causing a chain in which a plurality of links each having a flat placement surface are linked by pins to travel on a suction portion and to convey conveyance objects while adsorbing the conveyance objects to adsorption holes opening to the placement surface (see Japanese Application Laid-Open Patent No. 2001-335135 and No. Hei. 10-129820). The chain for the vacuum conveyor enables to place bottom surfaces of cans or PET bottles on the placement surfaces, to cause a negative pressure of the suction portion to act to the cans and PET bottles on the placement surfaces from the adsorption holes and to convey the cans and the PET bottles along a slope or a vertical surface.

The chain for the vacuum conveyor disclosed in Japanese Application Laid-Open Patent No. 2001-335135 is provided with through holes (suction hole) having an equal diameter (straight) and positioning projections on flat links (flat body). In a case where the PET bottles, i.e., the conveyance objects, travel on a suction box disposed at an inclined position and having a low degree of vacuum, absorption power from the suction holes drops and the PET bottles shift by their own weight. Then, the PET bottles abut with the positioning projections disposed at certain intervals and are aligned by being positioned in conveyance and transverse directions.

The vacuum conveyor disclosed in Japanese Patent Application Laid-Open No. Hei. 10-129820 is a conveyer configured to convey empty PET bottles in a single row in an upright state and is provided with a groove-like suction gutter formed at a center in a moving direction by two rows of top chains. This arrangement makes it possible to enhance the absorption power to the bottle bottoms in the row while reducing a pressure loss and to stably convey the PET bottles.

The vacuum conveyor disclosed in Japanese Application Laid-Open Patent No. 2001-335135 has the suction hole formed in the flat link (flat plate member), which is a straight through hole having an equal diameter from the front surface (placement surface) to the back surface (suction box-side surface). Therefore, even though it is possible to acquire enough absorption power for the empty PET bottles in a single row, there is a possibility that not enough absorption power can be obtained due to its small adsorption area and that it is unable to stably convey in conveying a plural rows of conveyance objects and relatively heavy conveyance objects such as cans.

Because the vacuum conveyor of Japanese Patent Application Laid-Open No. Hei. 10-129820 targets empty PET bottles in a single row, so that it is difficult to apply in a case of a wide chain and a chain for vacuum conveyor used in a can manufacturing process on which a plurality of conveyance objects is arrayed in a plurality rows.

SUMMARY OF THE INVENTION

According to one aspect of the present invention, a chain for a vacuum conveyor, includes a plurality of links each having a flat front surface for placing a conveyance object and a back surface facing to a suction portion. The plurality of links is endlessly linked by link members. A plurality of adsorption holes each having a large opening area on the front surface and a small opening area on the back surface is formed in the link. The adsorption hole includes a tapered portion on the front surface side and a straight portion having a same diameter and communicating with a least cross section side end of the tapered portion on the back surface side. The link has link portions disposed at front and rear sides in a traveling direction and linked by the link members inserted therethrough, and a plate portion composing the flat front surface between the front and rear link portions. A cylindrical portion is integrally molded with the plate portion on the back surface side, the tapered portion of the adsorption hole is formed in the plate portion and the straight portion is formed in the cylindrical portion.

Further features of the present invention will become apparent from the following description of exemplary embodiments with reference to the attached drawings.

BRIEF DESCRIPTION OF THE DRAWINGS

FIG. 2A is a plan view illustrating a chain for a vacuum conveyor according to an embodiment of the present invention.

FIG. 2B is a front view of the chain shown in FIG. 2A.

FIG. 2C is a bottom view of the chain shown in FIG. 2A.

FIG. 2D is a side view of the chain shown in FIG. 2A.

FIG. 6 is a chart indicating flow analyses of different shape adsorption holes.

DESCRIPTION OF THE EMBODIMENTS

Figure 1:
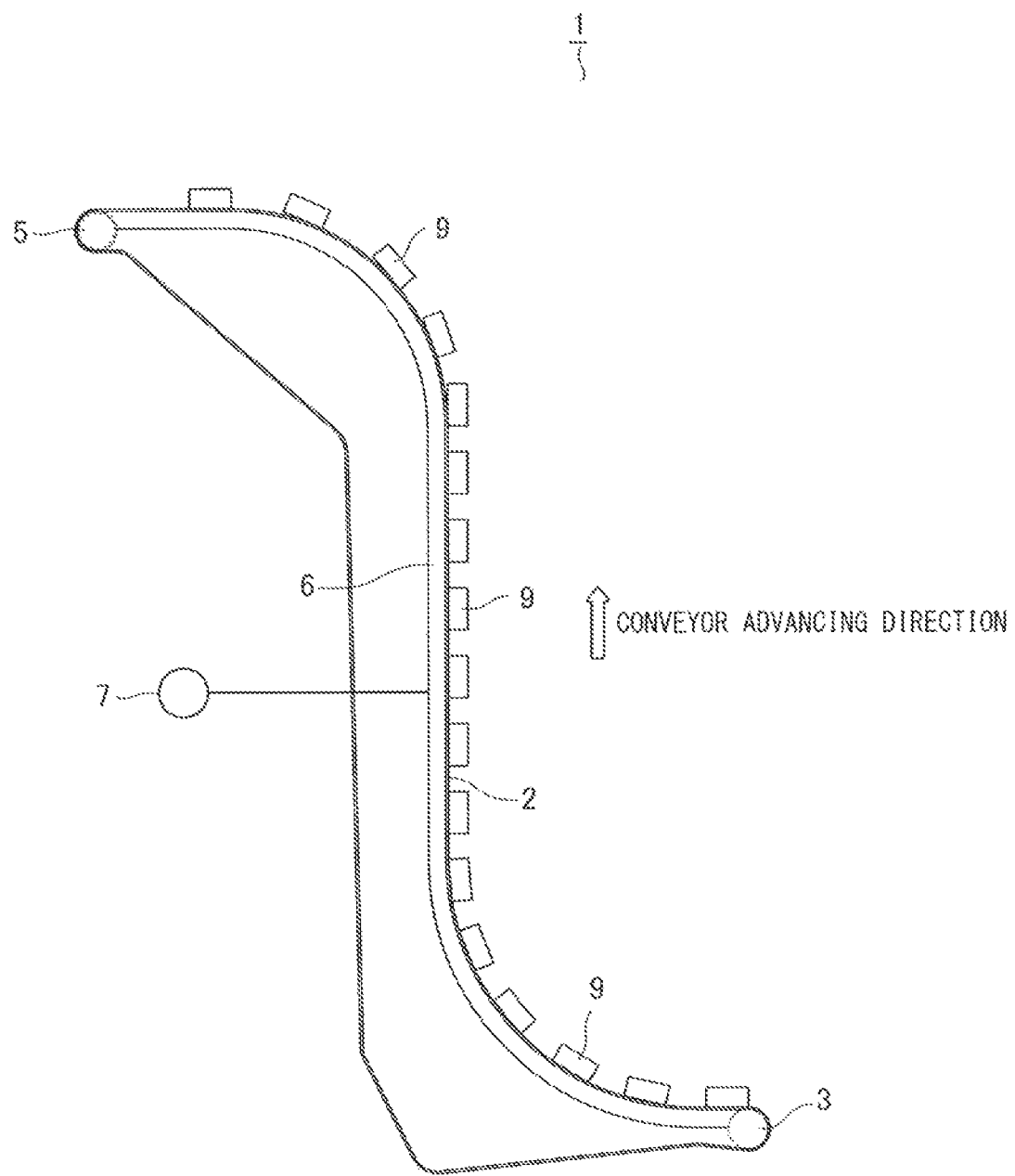
FIG. 1 is a schematic diagram of a vacuum conveyor to which the present invention is applied.

An embodiment of the present invention will be described with reference to the drawings. As illustrated in FIG. 1, a vacuum conveyor 1 to which the present invention is applicable includes an endless chain 2 which is guided by traveling guides and is wrapped around sprockets 3 and 5. The chain 2 includes a large number of links each having a flat placement surface and is flexibly linked, is driven by rotation of at least one of the sprockets 3 and 5 and travels by being guided by the traveling guides. A suction chamber (suction portion) 6 is disposed so as to face a back surface side, in a case where the placement surface is assumed to be a front surface, and along a conveyance side of the chain 2. The suction chamber 6 is in communication with a suction unit (vacuum device) 7 such as a blower fan and is in a condition of being a predetermined negative pressure (lower than the atmospheric pressure) by the suction unit 7. Each link of the chain 2 includes adsorption holes formed so as to penetrate therethrough and the negative pressure from the suction chamber 6 acts on a conveyance object 9 such as a can on the placement surface (surface) through the adsorption hole to adsorb the conveyance object 9 to the chain 2 and to convey the conveyance object 9.

While the suction chamber 6 is formed of one chamber communicating along the entire conveyance side of the vacuum conveyor 1 and one set of the suction unit 7 is set in the present embodiment, they can be divided into a plurality of parts. For instance, the suction chamber may be divided into plural chambers communicating with different suction units, respectively. Thereby, a conveyance object will not fall out even if the negative pressure of the suction unit is weakened for the suction chambers of the chain 2 placed on a horizontal plane. It is possible to prevent the conveyance object from falling down or deviating out of the conveyer by its own weight even if a part of the suction chambers is located close to a vertical surface by strongly adsorbing the conveyance object by causing the suction unit to act strong negative pressure to the conveyance object. The suction unit causes an intermediate negative pressure to act on suction chambers of a slope part which is a connecting part thereof.

As illustrated in FIGS. 2A through 2D and FIG. 3, the chain 2 is constructed endlessly by linking links 11 ($11_1$, $11_2$) by pins 12 in lateral (widthwise) and vertical (traveling) directions. The links 11 include two kinds of a long link $11_1$ and a short link $11_2$ and a length of the long link $11_1$ is twice of a length of the short link $11_2$. Note that because the long link $11_1$ and the short link $11_2$ have the same shape except of that their lengths are different, they will be denoted just as the link 11 except of a case where it is necessary to distinct the long link $11_1$ and the short link $11_2$. The link 11 is made of synthetic resin molded by injection molding and includes a plate portion 11b having a placement surface 11a of a flat front surface A and link portions 11d and 11e having pin holes 11c (see FIG. 4) defined before and after in a traveling direction of the plate portion 11b. The former and rear link portions 11d and 11e project alternately from the plate portion 11b at predetermined intervals in the width direction and each link portion fits in a space 11f between link portions of the former and rear adjacent links. Thereby, the pin 12 is inserted through the pin holes 11c of the link portions 11d and 11e of the former and rear links 11 aligned in the lateral direction such that the links 11 are linked in the lateral and vertical directions. A concave portion 11g that is engageable with a plug 13 is defined on an end surface of the link 11 such that the pin 12 is positioned by fitting the plug 13 engageable with the concave portion 11g at the both ends of the pin 12.

In the present embodiment, a train 11A in which three long link $11_1$ and short links $11_2$ provided at both sides thereof are combined in the lateral direction is connected with a train 11B in which four long links $11_1$ are arrayed in the lateral direction by being arrayed alternately in the front-back direction. This arrangement makes it possible to bear a force in a direction in which the links are laterally separated because joints C and D of the links adjacent in the lateral direction shift at the former and rear link trains 11A and 11B even in the wide chain 2 in which the plurality of links 11 is arrayed in the lateral direction. That is, because the link portions 11d and 11e of the respective links 11 engage with each other, the force in the direction in which the respective links laterally separate is supported.

Ribs 11h are formed so as to project out of the plate portions 11b to link end portions of former and rear link portions 11d and 11e alternately projecting on the back surface B (see FIG. 2C) on a side opposite from the placement surface 11a of the front surface A of the respective links 11. Thereby, predetermined concave portions 11i are defined per each former and rear link portions on the back surface B of the plate portion 11b. The large number of concave portions 11i laterally partitioned on the back surface B of the link is integrally molded with cylindrical portions 11k so as to project out of the back surface of the plate portion 11b at predetermined intervals, and remaining concave portions 11i are spaced. The concave portions having these cylindrical portions 11k and the concave portions 11i that define the spaces are aligned in the front-rear direction, tooth of the sprockets 3 and 5 engage with predetermined trains of the concave portions 11i that define the spaces and the chain 2 is driven.

Figure 4:
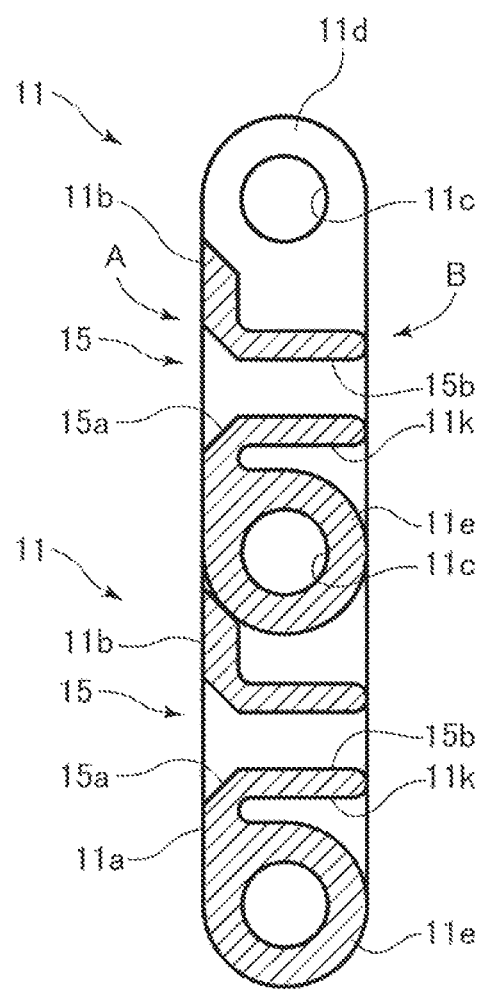
FIG. 4 is a section view taken along a line IV-IV in FIG. 2A.

An adsorption hole 15 is defined at a position corresponding to the cylindrical portion 11k on the plate portion 11b of the link 11. As illustrated in FIG. 4, the adsorption hole 15 around the plate portion 11b is tapered as a tapered portion 15a. The tapered portion is opened to the placement surface 11a. An opening area is larger than a cross section of an opening area on the back surface side of the plate portion 11b. The adsorption hole 15 also includes a straight portion 15b having an equal diameter and formed of an inner cylindrical surface having a predetermined length of the cylindrical portion 11k. The straight portion 15b communicates with a least cross section portion of the tapered portion 15a, extends to the back surface B side with the same diameter and opens at its edge. The back surface opening of the adsorption hole 15 extends to the back surface B of the link 11 or to a slightly shorter position. It is noted that the front and rear in the traveling direction is stipulated tentatively and the front and back may be either way because it depends on attachment of the chain 2 to the vacuum conveyor 1.

Figure 5:
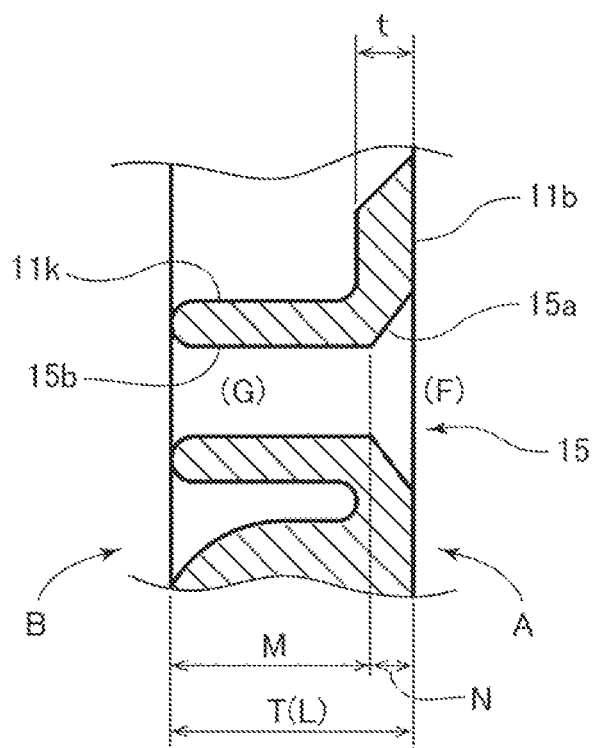
FIG. 5 is a section view illustrating adsorption holes of the present embodiment.

As illustrated in FIG. 5, the adsorption hole 15 includes the tapered portion 15a defined in the plate portion 11b and the straight portion 15b defined in the cylindrical portion 11k. The opening of the surface side of the adsorption hole 15 is a maximum area (opening area) F of the tapered portion 15a, and the opening on the back surface side communicates with a least area of the tapered portion 15a and the straight portion 15b having the same diameter of the least area extends. Accordingly, the opening area opening to the back surface B side has an inner diametric cross section G of the straight portion 15b. According to the present embodiment, an area ratio of the both openings of the adsorption hole 15 is F (e.g., $\varphi 7$)/G (e.g., $\varphi 3$), which is about 5.44. A plate thickness t of the plate portion 11b is 2.3 mm for example, and an axial length N of the tapered portion 15a defined through the plate portion is a value smaller than the t (N<t). That is, the tapered portion 15a is defined on the front surface A side of the plate portion 11b and the straight portion 15b defined in the cylindrical portion 11k slightly extends along a thickness part of the plate portion 11*b* and communicates with the inner diametric cross section G of the tapered portion 15*a*. In the present embodiment, the axial length N of the tapered portion 15*a* is 1.5 mm for example. The cylindrical portion 11*k* integrally formed with the back surface of the plate portion 11*b* extends to a length equal to the plate thickness T (9 mm for example) of the link 11. An axial total length L of the adsorption hole 15 is substantially equal to a link thickness T, and a length M of the straight portion 15*b* is T−N (9−1.5), i.e., 7.5 mm. Accordingly, a ratio M/L, i.e., the ratio of the length M of the straight portion 15*b* to the axial total length L of the adsorption hole 15 in the present embodiment is about 0.83. Note that the axial length N of the tapered portion 15*a* may be approximately equal to the plate thickness t. Still further, the axial length N of the tapered portion 15*a* may be greater than the plate thickness t. That is, the part of the tapered portion 15*a* communicating with the straight portion 15*b* may be formed in the cylindrical portion 11*k*.

The vacuum conveyor 1 of the present embodiment travels while placing the conveyance objects 9 such as cans on the placement surfaces of the chain 2. In traveling on the suction chamber 6 to which the negative pressure is applied by the suction unit 7, the conveyance objects on the placement surfaces are adsorbed by the adsorption holes 15 defined through the links 11 of the chain 2 and are conveyed stably without being fallen down or shifted even in a slope or in a vertical surface.

The adsorption hole 15 defined in each link 11 is opened at the front surface A, i.e., the placement surface 11*a*, with a large area F of the tapered portion 15*a*, and the negative pressure from the suction chamber 6 acts on the conveyance object 9 such as a can with the large opening area F of the adsorption hole 15. As illustrated in FIG. 2A, a large number of adsorption holes 15 is provided in the vertical and lateral directions which are the traveling direction and a width direction. There is also a large number of adsorption holes 15 on which no conveyance object 9 is placed (adsorbed). While air is suctioned through the adsorption hole 15 on which no conveyance object is adsorbed to the suction chamber 6 and the negative pressure (low pressure) of the suction chamber 6 is weakened, the opening of the adsorption hole 15 on the back surface B side facing to the suction chamber 6 is the small area G and generates a resistant force to a flow of air passing through the adsorption hole 15. Still further, the back surface B side of the adsorption hole 15 is the straight portion 15*b* formed of the cross section of the small area G and the axial length M of the straight portion is a section of a small area of a length around 80% with respect to the whole length L of the adsorption hole 15, so that a large absorption resistance is generated.

This arrangement makes it possible to strongly adsorb the conveyance object 9 such as the can by the surface opening having the large area F of more than five times of the cross section (back surface side opening area) of the straight portion 15*b* having the small area G and to stably convey the conveyance object even on a vertical surface while keeping the drop of the pressure (difference with the atmospheric pressure) low of the suction chamber 6. Still further, due to the large adsorption area and the low pressure drop, a small and energy-saving unit may be used as the suction unit 7 that applies the negative pressure to the suction chamber 6 accordingly. In particular, even in the wide chain 2 including the 32 adsorption holes 15 laterally arrayed in a row like the present embodiment, it becomes possible to keep the strong absorption power by the large absorption area and the low pressure drop and to convey the conveyance objects efficiently while laterally placing the plurality of conveyance objects such as the cans.

FIG. 6 is a table comparing and indicating analytical results of absorption powers of the adsorption holes of various shapes. The analyses were made by constantly keeping air quantity passing through the adsorption holes of various shapes and by calculating wind speed and pressure distribution at each time. A pressure difference at both opening parts of each adsorption hole is analyzed and a product of the pressure and the opening area on the surface side of the adsorption hole is calculated as the absorption power as a result. No. 1 is an adsorption hole formed of a straight through hole having the same length with the plate thickness t of the plate portion 11*b* and the same cross section with the inner diametric cross section G on the back surface B side. While its pressure drop is less, its absorption area is small, so that enough absorption power cannot be obtained. No. 2 is a straight adsorption hole having the small cross section G and the same thickness with the thickness T of the link 11. While the pressure drop is lesser, it is unable to obtain enough absorption power because the absorption area is small.

No. 3 is an adsorption hole having the same length with the plate thickness t of the plate portion 11*b* and a tapered portion having an opening of a large area F on the surface and an opening of a small area G on the back surface. Although a pressure drop of the adsorption hole is slightly large, the adsorption hole have a relatively favorable absorption power because an absorption area is large. No. 4 is an adsorption hole having the same length with the plate thickness T of the link 11 and having a tapered portion having a large area F on the surface and an opening of a small area G on the back surface. Although a pressure drop of the adsorption hole is large more or less as compared to No. 3, it has a large absorption area and relatively favorable absorption power even though it is slightly inferior as compared to No. 3 described above.

No. 5 is an adsorption hole having a tapered portion on the surface side and having a straight portion on the back surface side. The adsorption hole has an axial length of the tapered portion which is equal to the thickness t of the plate portion 11*b*, has a surface opening of a large area F, has a total length equal to a total length of the link 11 (=T) and has a cross section that is equal to a small area G The adsorption hole has a strong absorption power because its pressure drop is small and an absorption area is large. No. 6 is an adsorption hole corresponding to the present embodiment of the present invention described above and has a tapered portion having an opening of a large area F on the surface side and a length (N) smaller than the plate thickness t of the plate portion 11*b* and a straight portion of a length M on the back surface side. The adsorption hole has stronger absorption power more than No. 5 because its pressure drop is small and an absorption area is large.

No. 7 is an inverse tapered adsorption hole having an opening of a small area G on the surface side and an opening of a large area F on the back surface. Its pressure drop is large, its absorption area is small and absorption power is small. No. 8 is an inverse tapered adsorption hole with small inclination having an opening slightly larger than the small area G on the surface, an opening of the small area G on the back surface and a length equal to the thickness T of the link 11. Although the pressure drop of the adsorption hole is not so significant, enough absorption power cannot be obtained because its absorption area is small. No. 9 is a straight adsorption hole having a hexagonal section and length of the thickness t of the plate portion 11b. Although the pressure drop of the adsorption hole is small, it is unable to obtain enough absorption power because its absorption area is small. Note that it is needless to say that the cylindrical portions may be integrally molded with the plate portion in the adsorption holes described above having the same length with the thickness T of the link 11 indicated in No. 2, No. 4, No. 5, No. 6, No. 7 and No. 8 in particular.

Figure 7:
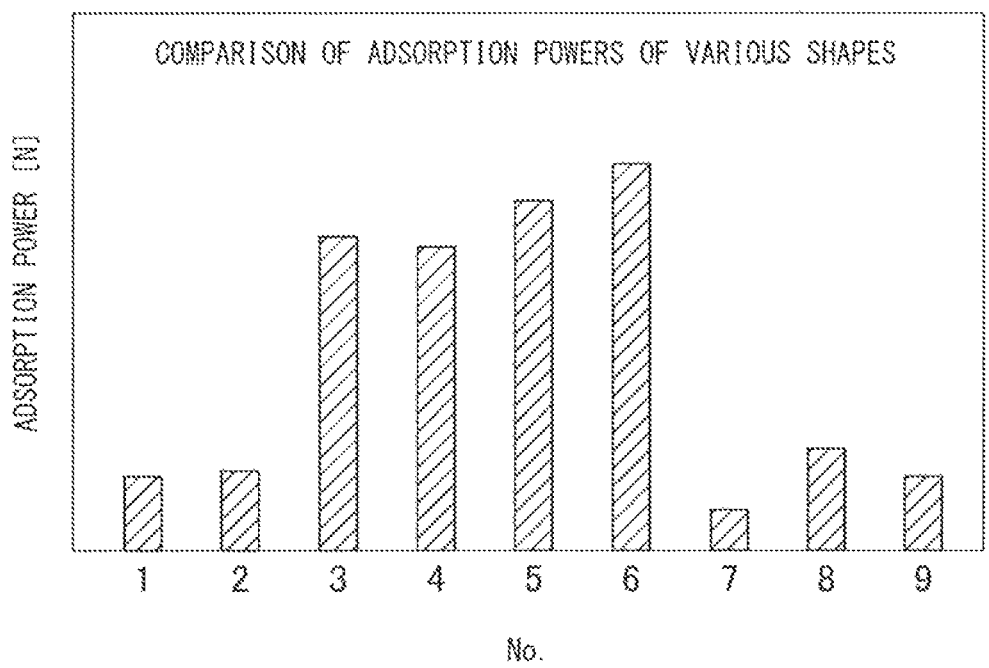
FIG. 7 is a graph indicating flow analytical result of the different shaped adsorption holes.

FIG. 7 is a graph indicating results of the analyses as indicated in FIG. 6. As it is apparent from the graph, the adsorption holes of No. 3, No. 4, No. 5 and No. 6 have remarkably large absorption powers and enough absorption power as compared to others, the adsorption holes of No. 5 and No. 6 in particular having the tapered portion and the straight portion are excellent.

Figure 8:
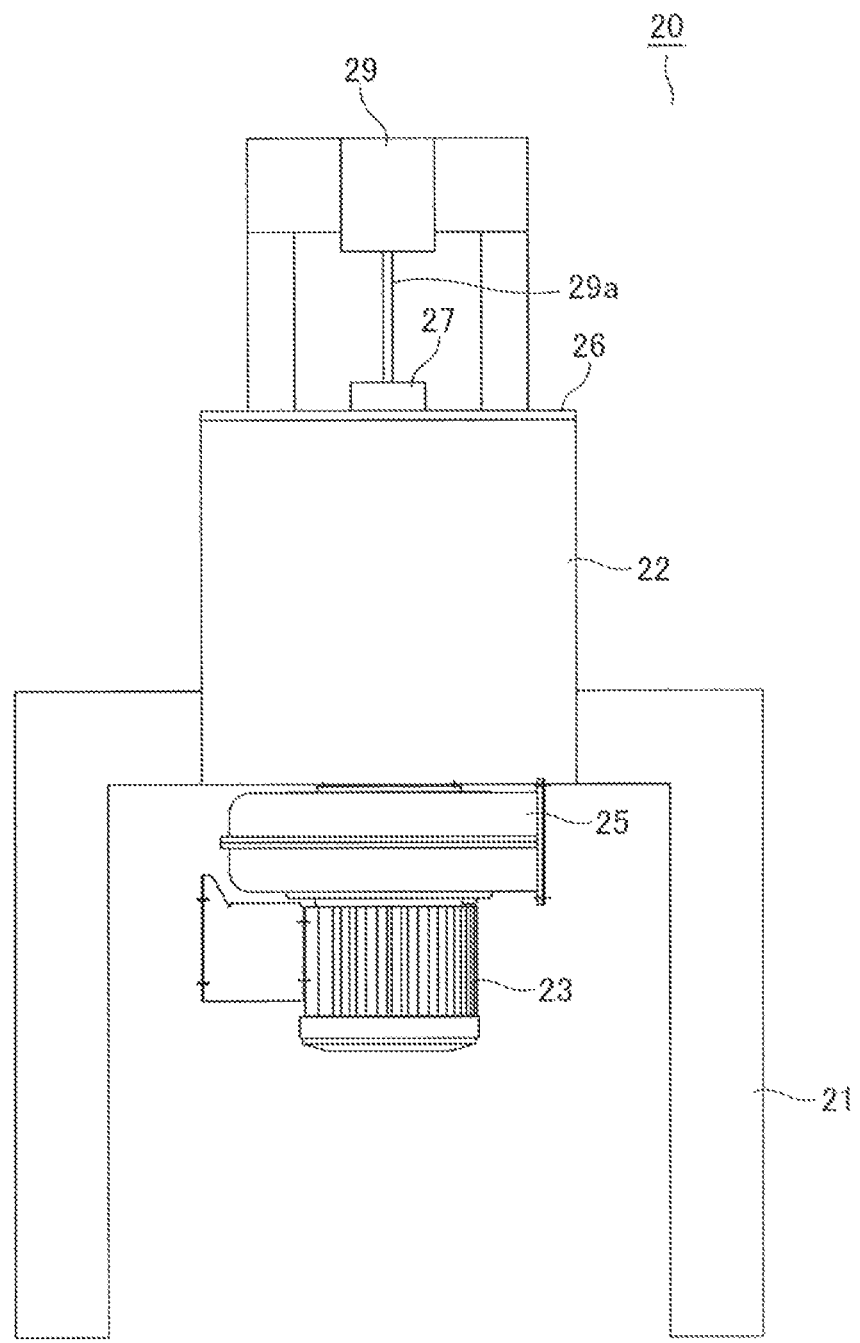
FIG. 8 is a front view illustrating a testing apparatus for testing performance of the adsorption holes.
Figure 9:
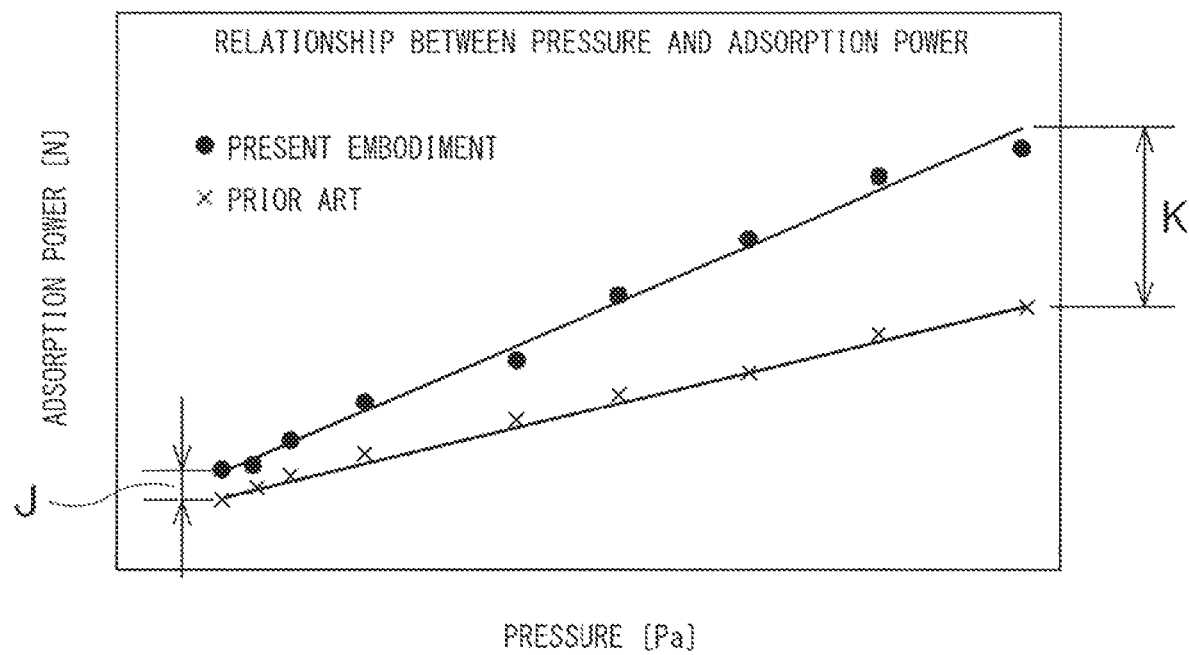
FIG. 9 is a graph indicating testing results of a conventional adsorption hole and the adsorption hole of the present embodiment.

Next, a test comparing the adsorption hole of No. 1 in FIG. 6 which is that of the conventional technology with the adsorption hole 15 (see No. 6) of the present embodiment of the present invention will be described with reference to FIGS. 8 and 9. First, a testing device will be described with reference to FIG. 8. The testing device 20 includes a suction chamber 22 supported by legs 21. A suction fan 25 having a motor 23 is provided under the suction chamber 22. A measuring jig 26 that corresponds to a chain is attached on an upper surface of the suction chamber 22. A plurality of jigs through which a same number of various types of suction holes is defined is used as the measuring jig 26, and in the test, a measuring jig of an adsorption hole of the prior art of No. 1 and a measuring jig of an adsorption hole (see No. 6) of the present embodiment are used. An adsorption object 27 is placed on the measuring jig 26. A force gage (adsorption force measuring unit) 29 is disposed above the absorption object 27 through a rod 29a.

By using the testing device 20 described above, the negative pressure of the suction chamber 22 is changed to measure the measuring jig 26 having the adsorption hole of No. 1 and the measuring jig 26 having the adsorption hole of No. 6 of the present invention. Absorption powers of the absorption object 27 by the adsorption holes of these measuring jigs 26 were measured by the force gage 29. FIG. 9 indicates measurement results. The absorption power J of the adsorption hole of the present invention increased by about 40% as compared to the prior art on the side where the negative pressure is low and the absorption power K increased by about 60% on a side where the negative pressure is large.

FIG. 10 illustrates outlines of various adsorption holes 15 according to the present embodiment of the present invention. The adsorption holes of the present invention have large opening areas on the front surface A side and small opening areas on the back surface B side. FIGS. 10A and 10B illustrate adsorption holes $15_2$ and $15_3$ composed of only the tapered portions 15a. The adsorption holes in FIGS. 10A and 10B have different axial lengths, i.e., tapered angles, and a length of the adsorption hole $15_2$ in FIG. 10A is equal to the plate thickness t of the plate portion 11b and a length of the adsorption hole $15_3$ in FIG. 10B is equal to the thickness T of the link 11.

Figure 10A:
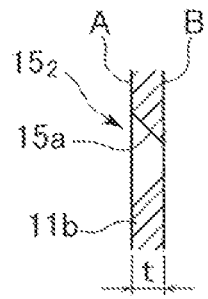
FIG. 10A through 10E are section view of adsorption holes of different embodiments.
Figure 10B:
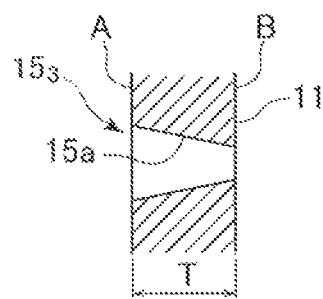
Figure 10C:
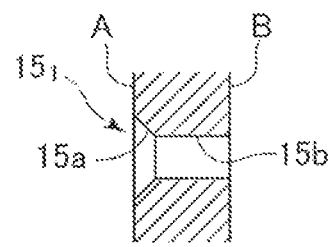
Figure 10D:
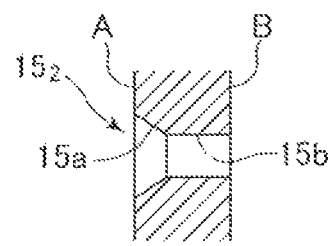
Figure 10E:
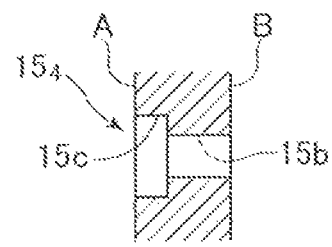

FIGS. 10C and 10D illustrate adsorption holes $15_1$ and $15_2$ in which the adsorption holes are composed of tapered portions and straight portions. The adsorption holes in FIGS. 10C and 10D have different rates of lengths of the tapered portion and the straight portion. The rate of the length of the straight portion 15b of the adsorption hole $15_1$ in FIG. 10C is large as compared to that of the adsorption hole $15_2$ in FIG. 10D. An adsorption hole $15_4$ in FIG. 10E includes a part where an opening area on the front surface A side is formed of a large cylindrical hole 15c and a straight portion 15b communicating with a bottom surface of the cylindrical hole 15c and is a cylindrical hole having a small cross section. Note that while the adsorption holes in FIGS. 10B through E have lengths corresponding to the plate thickness T of the link, the adsorption holes and the straight portions in particular may be formed of the cylindrical portion. Still further, the lengths of the adsorption holes in FIGS. 10A through E are not limited to the plate thickness t of the plate portion or the thickness T of the link and may be arbitral length. The opening areas on the surface side is not limited to be the area F and the opening areas on the back surface side is not limited to be the area G.

Note that while the abovementioned embodiments have been described on the wide chain in which the large number of links 11 is connected in the width direction, the present invention is not limited that and is applicable to chains having any width. Still further, while the sections of the adsorption holes have been circular, the present invention is not limited to that and may be another sectional shape such as polygonal, oval and elliptical.

The ratio F/G of the opening area F on the surface and the opening area G on the back surface of the adsorption hole is not also limited to be 5.44 and may be within a predetermined range, e.g., a range of 4 to 9 for example. If the ratio F/G is 4 or less, the absorption area is deficient and if it is 9 or more, the suction resistance of the adsorption hole becomes excessive, disabling to obtain enough absorption power. The ratio M/L of the length M of the straight portion with respect to the axial total length L of the adsorption hole is not limited to be 0.83 and may be within a predetermined range, e.g., a range of 0.5 to 0.8 for example. If the ratio M/L is 0.5 or less, enough suction resistance cannot be obtained and if it is 0.8 or more, the length of the large area part (taped portion) on the surface side cannot be assured, possibly causing a trouble in a smooth flow of fluid on the surface side.

A chain (2) for a vacuum conveyor includes a plurality of links (11) having a flat front surface (A) on which a conveyance object is placed and a back surface (B) facing a suction chamber (6), the plurality of links (11) being linked endlessly by link members (12). A plurality of adsorption holes (15) each having a large opening area (F) on the front surface (A) and a small opening area (G) on the back surface (B) is formed in the links (11).

With reference to FIGS. 4 and 5 for example, the adsorption hole (15) includes a tapered portion (15a) on the front surface (A) side and a straight portion (15b) having a same diameter and communicating with a least cross section side end of the tapered portion on the back surface (B) side.

Figure 3:
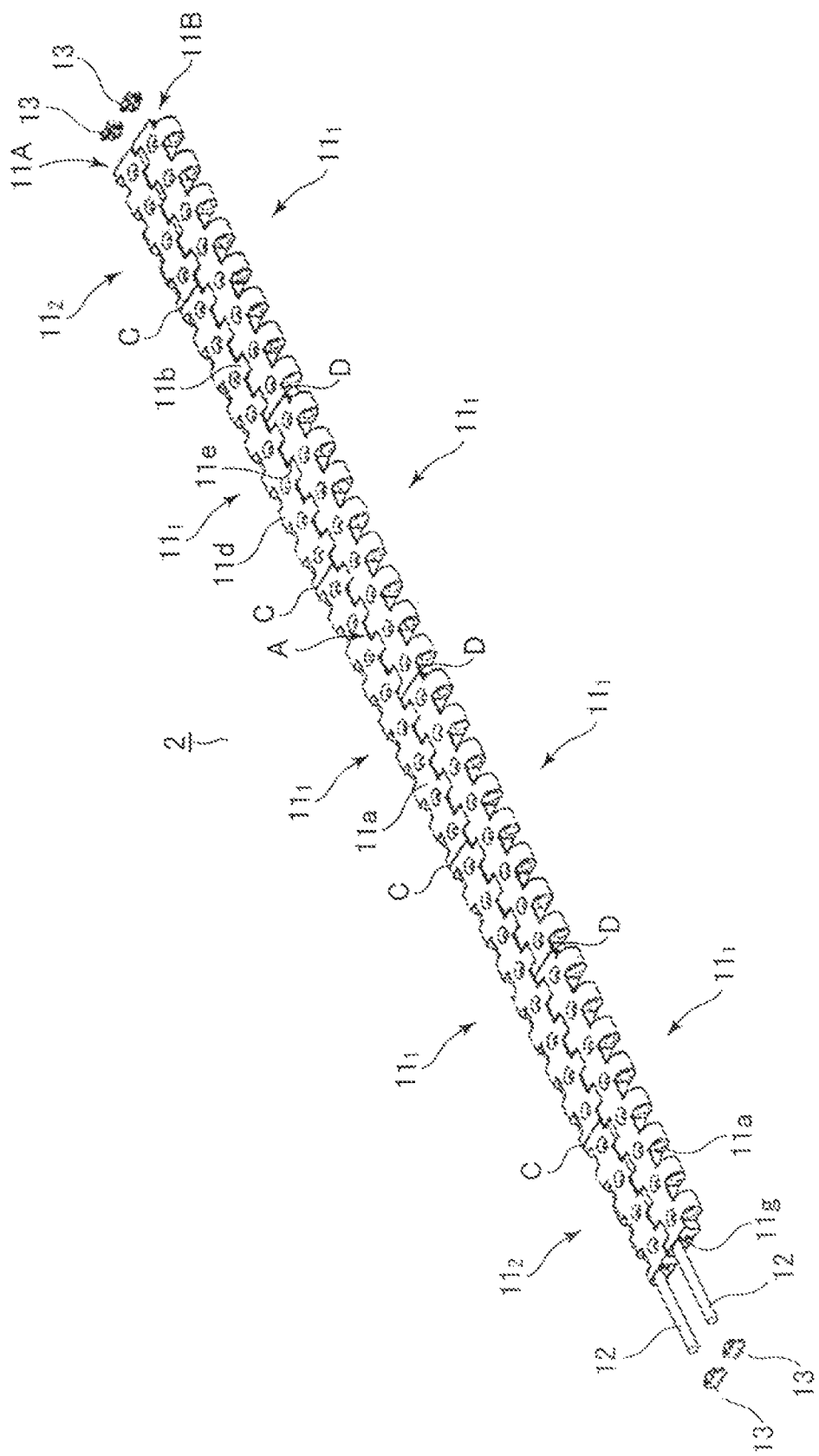
FIG. 3 is a perspective view illustrating the chain for the vacuum conveyor according to the embodiment of the present invention.

With reference to FIGS. 2 through 4 for example, the link (11) has link portions (11d and 11e) disposed at front and rear sides in a traveling direction and linked by link members (12) inserted therethrough, and a plate portion 11b composing the flat front surface (A) between the front and rear link portions. A cylindrical portion (11k) is integrally molded on the back surface side of the plate portion, a tapered portion (15a) of the adsorption hole is defined in the plate portion (11b) and the straight portion (15b) is formed in the cylindrical portion (11k).

In a case where the opening area on the surface (A) is denoted as F and the opening area on the back surface (B) side is denoted as G, the adsorption hole (15) is formed such that a ratio F/G falls within a range of 4 to 9.

In a case where an total length, in an axial direction, of the adsorption hole is denoted as L and an axial length of the straight portion (15b) is denoted as M, the adsorption hole (15) is formed such that a ratio M/L falls within a range of 0.5 to 0.8.

With reference to FIGS. 1 through 3 for example, the links (11, 11₁, 11₂) are disposed by being arrayed by three or more in a width direction and compose a wide chain (2) capable of adsorbing a plurality of conveyance objects (9) on the front surface (A) in the width direction.

It is noted that the reference numerals within the parentheses are denoted for collating with the drawings and do not effect configurations described in claims by any means.

Because the opening area of the adsorption hole on the front surface is large, it is possible to stably convey the conveyance object by adsorbing the conveyance object placed on the surface of the link with the large absorption area. Still further, because the opening area of the adsorption hole on the back surface side is relatively small, suction resistance increases. The conveyance object can be stably conveyed while keeping a degree of vacuum (low pressure) of the suction portion by using a relatively small suction unit by reducing a drop of pressure from the adsorption holes not in contact with the conveyance object.

The adsorption hole includes the tapered portion on the front surface side and the straight portion having the same diameter on the back surface (B) side, so that a plural rows of cans, for example, can be conveyed stably by a wide chain by enhancing suction resistance and by reducing drop of pressure from the adsorption hole by the straight portion.

The cylindrical portion is integrally molded with the back surface side of a plate portion having the tapered portion and the straight portion is formed in the cylindrical portion, so that the straight portion having the predetermined length can be readily obtained. This arrangement makes it possible to securely prevent the drop of the pressure and to improve durability of the vacuum conveyer chain by keeping rigidity of the link integrally molded.

It is possible to stably keep, for example, the conveyance of cans in a can-manufacturing process by keeping a balance of the absorption area and the suction resistance of the adsorption hole.

It is possible to keep the suction resistance to an adequate value by optimizing the ratio of the length of the straight portion to the total length of the adsorption hole while keeping the absorption area.

It is possible to convey conveyance objects such as cans efficiently by laterally adsorbing the plurality of conveyance objects by using the wide chain in which three or more links are laterally arrayed and disposed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A chain for a vacuum conveyor, comprising:
a plurality of links each having a flat front surface for placing a conveyance object and a back surface facing to a suction portion, the plurality of links being endlessly linked by link members,
wherein a plurality of adsorption holes each having a large opening area on the front surface and a small opening area on the back surface is formed in the link,
wherein the adsorption hole includes a tapered portion on the front surface side and a straight portion having a same diameter and communicating with a least cross section side end of the tapered portion on the back surface side,
wherein the link has link portions disposed at front and rear sides in a traveling direction and linked by the link members inserted therethrough, and a plate portion composing the flat front surface between the front and rear link portions, and
wherein a cylindrical portion is integrally molded with the plate portion on the back surface side, the tapered portion of the adsorption hole is formed in the plate portion and the straight portion is formed in the cylindrical portion.

2. The chain for the vacuum conveyor according to claim 1, wherein the adsorption hole is formed such that a ratio F/G falls within a range of 4 to 9, where F is the opening area on the front surface and G is the opening area on the back surface side.

3. The chain for the vacuum conveyor according to claim 1, wherein the adsorption hole is formed such that a ratio M/L falls within a range of 0.5 to 0.8, where L is the total length, in an axial direction, of the adsorption hole and M is an axial length of the straight portion.

4. The chain for the vacuum conveyor according to claim 1, wherein the links are disposed by being arrayed by three or more in a width direction and compose a wide chain capable of adsorbing a plurality of conveyance objects on the front surfaces in the width direction.

* * * * *